United States Patent
Wang et al.

(10) Patent No.: US 8,379,221 B2
(45) Date of Patent: Feb. 19, 2013

(54) INTERFERENCE CAVITY FOR CONTROLLING OPTICAL PATH

(75) Inventors: Zeqin Wang, Shenzhen (CN); Hong Xie, Shenzen (CN)

(73) Assignee: O-Net Communications (Shenzhen) Limited, Shenzhen (CN)

( * ) Notice: Subject to any disclaimer, the term of this patent is extended or adjusted under 35 U.S.C. 154(b) by 80 days.

(21) Appl. No.: 13/060,436

(22) PCT Filed: Mar. 2, 2010

(86) PCT No.: PCT/CN2010/070815
§ 371 (c)(1),
(2), (4) Date: Feb. 24, 2011

(87) PCT Pub. No.: WO2011/075964
PCT Pub. Date: Jun. 30, 2011

(65) Prior Publication Data
US 2011/0228281 A1 Sep. 22, 2011

(30) Foreign Application Priority Data
Dec. 22, 2009 (CN) .................. 2009 2 0261841 U

(51) Int. Cl.
*G01B 9/02* (2006.01)
(52) U.S. Cl. ........................... 356/508; 385/140

(58) Field of Classification Search .............. 356/508
See application file for complete search history.

(56) References Cited

U.S. PATENT DOCUMENTS
6,590,722 B1 * 7/2003 Koyama et al. ............... 359/820
2004/0136006 A1 * 7/2004 Abbink ........................ 356/451

OTHER PUBLICATIONS
http://www.rp-photonics.com/beam_splitters.html.*

* cited by examiner

*Primary Examiner* — Tarifur Chowdhury
*Assistant Examiner* — Sunghee Y Gray

(57) ABSTRACT

The present patent application provides an interference cavity for precisely controlling an optical path including a cavity formed by two equal distance arms, wherein a positive adjusting plate and a negative adjusting plate are disposed in the interference cavity for compensating the change of a cavity length with temperature and thereby ensuring that the interference cavity length is a constant. The present patent application utilizes the matching relationship between the change of the refractive index of the positive adjustment plate with the temperature and the change of the refractive index of the negative adjusting plates with the temperature to make the optical path difference OPL invariant with changes in the environment temperature and thereby to ensure the precision of the optical path.

5 Claims, 2 Drawing Sheets

INTERFERENCE CAVITY FOR CONTROLLING OPTICAL PATH

FIELD OF THE PATENT APPLICATION

The present patent application relates to the field of optical communication and particularly to an interferometer for precisely controlling an optical path.

BACKGROUND

In the field of optical communication, differential phase-shift keying (DPSK) is a promising modulation scheme that provides high receiver sensitivity, high tolerance for main nonlinearities in high speed transmission and coherent crosstalk. The appearance of the interleaver technologies upgrades the design concept of wave separating/combining devices in dense wavelength division multiplexing (DWDM) and greatly reduces the design pressure of dense wavelength division multiplexor, while these devices are based on interferometers. The interferometer enables two light beams to transmit with the optical path difference (OPD) thereof being an expected value. However, the control of the interference cavity length difference is difficult. The change of the optical path difference directly affects the light interference intensity, thus the ambient temperature needs to be controlled so as to ensure the stability of the optical path difference. To balance the change due to the environment temperature variation, U.S. Pat. No. 6,924,894 discloses through disposing two heater and environment temperature sensors connected with a controller at the two interference arms, controlling the heaters and thereby balancing the influence of the environment temperature. This means must use complex electric circuits to eliminate the influence of the environment temperature. The cost is relatively high and the electric circuits are complex.

SUMMARY

To solve the above problems and obtain the above objectives, the present patent application provides an interference cavity for precisely controlling an optical path including a cavity formed by two equal distance arms, wherein a positive adjusting plate and a negative adjusting plate are disposed in the interference cavity for compensating the change of a cavity length with temperature and thereby ensuring that the interference cavity length is a constant.

The present patent application further provides an interferometer for precisely controlling an optical path including: a first port emitting an incident light beam; a light separator with a light separating/combining interface configured for splitting the incident light beam into a first and second light beams travelling along a first and a second optical paths respectively; a first total reflection mirror disposed on the first optical path apart from the light separator by a certain distance defining a first optical path length OPL1; and a second total reflection mirror disposed on the second optical path apart from the light separator by a certain distance defining a second optical path length OPL2; the incident light beam being split into the first and the second light beams at the light separator; the first and the second light beams being respectively reflected by the corresponding total reflection mirrors through the first and the second optical paths; because of the optical path difference OPD between the first optical path OPL1 and the second optical path OPL2, the returning light beams generate an interference output light beam at the light separating/combining interface of the light separator; wherein: a positive adjusting plate and a negative adjusting plate are disposed on the first optical path and configured for compensating the optical path difference OPL between the first optical path OPL1 and the second optical path OPL2 so as to ensure that the optical path difference OPD is a constant.

In a preferred embodiment, the positive adjusting plate is a glass plate with a refractive index that increases with the increase of the temperature, and the negative adjusting plate is a glass plate with a refractive index that decreases with the increase of the temperature.

In a preferred embodiment, the ratio between the slope K1 of the curve of the positive adjusting plate and the slope K2 of the curve of the negative adjusting plate is equal to the ratio between the thickness d2 of the negative adjusting plate and the thickness d1 of the positive adjusting plate.

In a preferred embodiment, the light separating/combining interface includes a light separating film.

The present patent application has the following advantages. The present patent application utilizes the matching relationship between the change of the refractive index of the positive adjustment plate with the temperature and the change of the refractive index of the negative adjusting plates with the temperature to make the optical path difference OPD invariant with changes in the environment temperature and thereby to ensure the precision of the optical path difference OPD.

BRIEF DESCRIPTIONS OF THE DRAWINGS

Further description is made to the present patent application hereafter with the illustration of the drawings and the embodiments.

DETAILED DESCRIPTION

Further description is made hereafter to the embodiments of the interference cavity for controlling optical path according to the present patent application with the illustration of the drawings.

Figure 1:
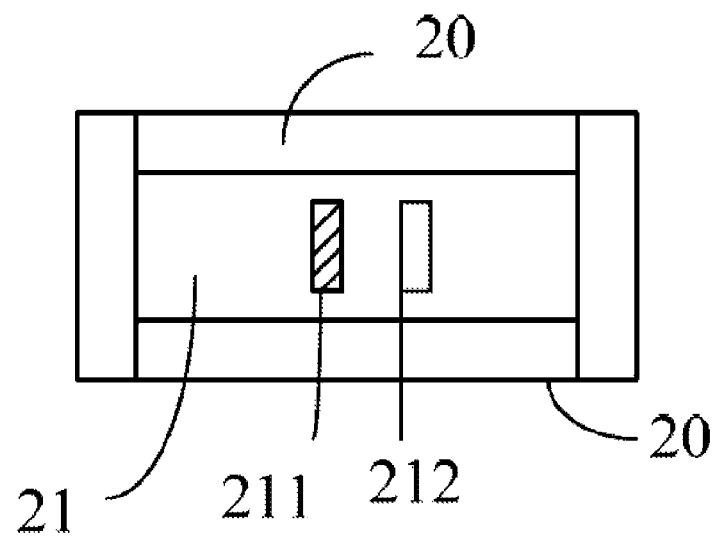
FIG. 1 illustrates a structure of an interference cavity for controlling optical path in accordance with a first embodiment of the present patent application.
Figure 2:
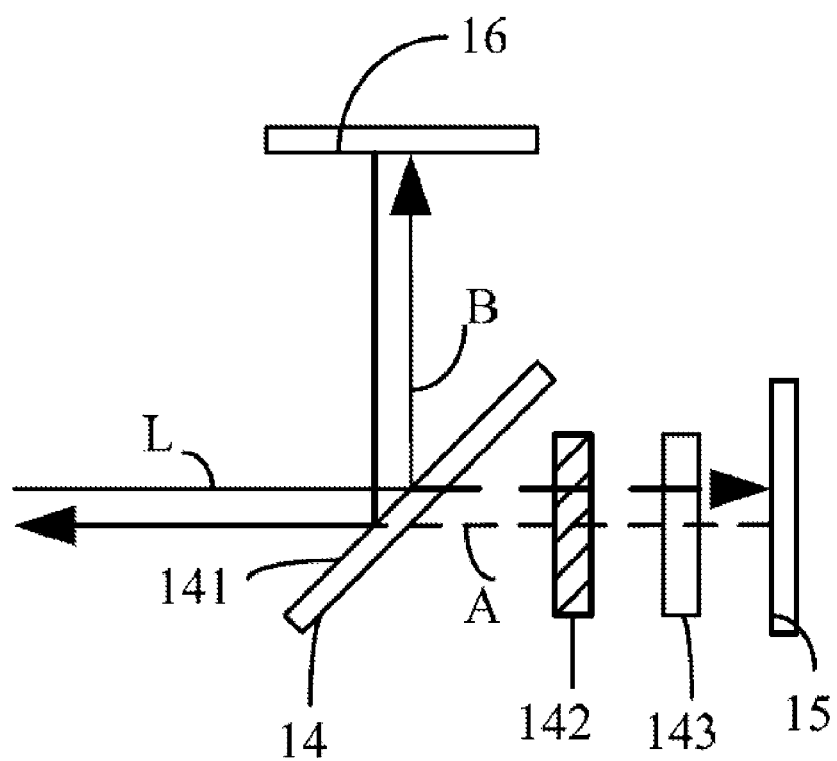
FIG. 2 illustrates a structure of an interferometer that includes an interference cavity for controlling optical path in accordance with the present patent application.
Figure 3:
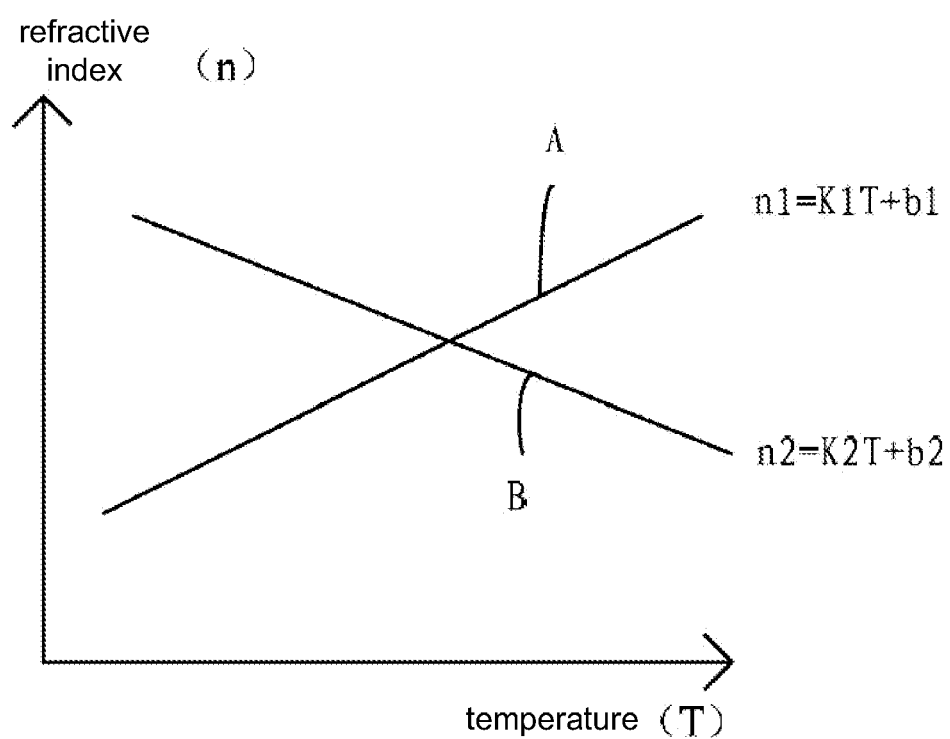
FIG. 3 illustrates the curves of the refractive index of the positive and negative adjustment plates versus the temperature in accordance with the present patent application.

FIG. 1 illustrates a structure of an interference cavity for controlling optical path in accordance with a first embodiment of the present patent application. Referring to FIG. 1, the interference cavity includes a cavity 21 formed by two equal distance arms 20. A positive adjusting plate 211 and a negative adjusting plate 212 are disposed in the cavity 21, wherein as illustrated in FIG. 3, the refractive index of the positive adjusting plate 211 increases with the increase of the temperature, while the refractive index of the negative adjusting plate 212 decreases with the increase of the temperature. Referring to FIG. 2, the curve A of the refractive index n1 of the positive adjusting plate 211 versus the temperature T satisfies $n1=K1T+b1$, while the curve B of the refractive index n2 of the negative adjusting plate 212 versus the temperature T satisfies $n2=K2T+b2$, wherein the K1 and K2 are the slopes of the curves A and B respectively. From the abovementioned curves A and B, it can be deduced that the optical path length (OPL) of the interference cavity satisfies: $OPL=d1(K1T+b1)+d2(K2T+b2)+L-d1-d2$ (1), wherein L is the physical length of the cavity. To make the above equation (1) invariant with changes of the environment temperature, which means the OPL is a constant C, C=d1·(K1T+b1)+d2·(K2T+b2)+L, it is only required that the terms varying with the temperature counteract each other, i.e. d1K1T+d2K2T=0, in other words, K1/K2=−d2/d1.

In summary, as long as the curves of the refractive index of the positive and negative adjustment plates 211 and 212 versus the temperature satisfy the K1/K2=−d2/d1 relationship, the optical path length OPL does not change with the change of the environment temperature and the precision of the optical path length OPL is ensured.

FIG. 2 illustrates a structure of an interferometer that includes an interference cavity for controlling optical path in accordance with the present patent application. Referring to FIG. 2, the delay line interferometer (DLI) has a Michelson interferometer structure including a 50% light separator 14 tilted at an angle of 45 degrees, a first total reflection mirror 15 that is horizontally aligned, and a second total reflection mirror 16 that is vertically aligned. An input light beam L goes through the light separating plane 141 of the precise 50% light separator 14 and is split into a first light beam A and a second light beam B. The first light beam A travels a certain distance, reaches the first total reflection mirror 15, and gets reflected by the first total reflection mirror 15 back to the light separating plane 141 of the light separator 14. In the same way, the second light beam B, after being reflected by the light separating plane 141, is reflected by the second total reflection mirror 16 back to the light separating plane 141. The reflected light beam B interferes with the transmitted light beam A and thereby an interference light beam is obtained.

Referring to FIG. 2, to adjust the optical path difference between the two interference arms, in this embodiment, the positive and negative adjusting plates 142 and 143 are disposed between the first total reflection mirror 15 and the light separator 14. Referring to FIG. 2, the curve A of the refractive index n1 of the positive adjusting plate 211 versus the temperature T satisfies n1=K1T+b1, while the curve B of the refractive index n2 of the negative adjusting plate 143 versus the temperature T satisfies n2=K2T+b2, wherein the K1 and K2 are the slopes of the curves A and B respectively. From the abovementioned curves A and B, it can be deduced that the first optical path length OPL1 satisfies:

$$OPL1 = d1 \cdot (K1T+b1) + d2 \cdot (K2T+b2) + L1$$

The second optical path length OPL2 satisfies: OPL2=L2. The optical path difference is: OPD=OPL1−OPL2=d1·(K1T+b1)+d2·(K2T+b2)+L1−L2 (1)

To make the optical path difference OPD a constant, i.e. invariant with changes in the temperature, it only needs to be satisfied that d1·(K1T+b1)+d2·(K2T+b2)+L1−L2=constant C, which means, it is only required that the terms varying with the temperature in the equation (1) counteract each other, i.e. d1K1T+d2K2T=0, in other words, K1/K2=−d2/d1.

In summary, as long as the curves of the refractive index of the positive and negative adjustment plates 142 and 143 versus the temperature satisfy the K1/K2=−d2/d1 relationship, the optical path difference OPD does not change with the change of the environment temperature and the precision of the optical path difference OPL is ensured.

The present patent application has the following advantages.

The present patent application utilizes the matching relationship between the change of the refractive index of the positive adjustment plate with the temperature and the change of the refractive index of the negative adjusting plates with the temperature to make the optical path difference OPL invariant with changes in the environment temperature and thereby to ensure the precision of the optical path difference OPD.

While the present patent application has been shown and described with particular references to a number of embodiments thereof, it should be noted that various other changes or modifications may be made without departing from the scope of the present invention.

What is claimed is:

1. An interference cavity for precisely controlling an optical path comprising a cavity, wherein a positive adjusting plate with a refractive index increasing with the increase of temperature and a negative adjusting plate with a refractive index decreasing with the increase of temperature are disposed in the interference cavity for compensating the change of a cavity length with temperature and thereby ensuring that the interference cavity length is a constant; wherein the ratio between a change of refractive index of the positive adjusting plate with an increment of temperature and a change of refractive index of the negative adjusting plate with an increment of temperature is equal to the ratio between the thickness d2 of the negative adjusting plate and the thickness d1 of the positive adjusting plate.

2. The interference cavity for precisely controlling an optical path of claim 1, wherein the positive adjusting plate and the negative adjusting plate are made of glass or birefringent crystal.

3. An interferometer for precisely controlling an optical path comprising: a first port emitting an incident light beam; a light separator with a light separating/combining interface configured for splitting the incident light beam into a first and second light beams travelling along a first and a second optical paths; a first reflection mirror disposed on the first optical path apart from the light separator by a certain distance defining a first optical path length OPL1; and a second reflection mirror disposed on the second optical path apart from the light separator by a certain distance defining a second optical path length OPL2; the incident light beam being split into the first and the second light beams at the light separator; the first and the second light beams being respectively reflected by the corresponding reflection mirrors through the first and the second optical paths; because of the optical path difference OPD between the first optical path OPL1 and the second optical path OPL2, the returning light beams generating an interference output light beam at the light separating/combining interface of the light separator; wherein a positive adjusting plate with a refractive index increasing with the increase of temperature and a negative adjusting plate with a refractive index decreasing with the increase of temperature are disposed on the first optical path and configured for compensating the temperature dependence of OPD, so as to ensure that the optical path difference OPD is a constant; the positive adjusting plate is a glass plate with a refractive index that increases with the increase of the temperature, and the negative adjusting plate is a glass plate with a refractive index that decreases with the increase of the temperature; the ratio between a change of refractive index of the positive adjusting plate with an increment of temperature and a change of refractive index of the negative adjusting plate with an increment of temperature is equal to the ratio between the thickness d2 of the negative adjusting plate and the thickness d1 of the positive adjusting plate; the light separating/combining interface comprises a light separating film.

4. An interferometer for precisely controlling an optical path comprising: a first port emitting an incident light beam; a light separator with a light separating/combining interface configured for splitting the incident light beam into a first and second light beams travelling along a first and a second optical paths; a first reflection mirror disposed on the first optical path apart from the light separator by a certain distance defining a first optical path length OPL1; and a second reflection mirror disposed on the second optical path apart from the light separator by a certain distance defining a second optical path length OPL2; the incident light beam being split into the first and the second light beams at the light separator; the first and the second light beams being respectively reflected by the corresponding reflection mirrors through the first and the second optical paths; because of the optical path difference OPD between the first optical path OPL1 and the second optical path OPL2, the returning light beams generating an interference output light beam at the light separating/combining interface of the light separator; wherein a positive adjusting plate with a refractive index increasing with the increase of temperature and a negative adjusting plate with a refractive index decreasing with the increase of temperature are disposed on the first optical path and configured for compensating the optical path difference OPD between the first optical path OPL1 and the second optical path OPL2 so as to ensure that the optical path difference OPD is a constant; wherein the ratio between a change of refractive index of the positive adjusting plate with an increment of temperature and a change of refractive index of the negative adjusting plate with an increment of temperature is equal to the ratio between the thickness d2 of the negative adjusting plate and the thickness d1 of the positive adjusting plate.

5. The interferometer for precisely controlling an optical path of claim 4, wherein the light separating/combining interface comprises a light separating film.

* * * * *